United States Patent [19]

Berchem et al.

[11] Patent Number: 4,838,312

[45] Date of Patent: Jun. 13, 1989

[54] THREE-WAY VALVE

[75] Inventors: Rütger Berchem, Essen; Georg Prokscha, Recklinghausen, both of Fed. Rep. of Germany

[73] Assignee: Metallpraecis Berchem+Schaberg Gesellschaft Für Metallformgebung m.b.H., Gelsenkirchen, Fed. Rep. of Germany

[21] Appl. No.: 247,113

[22] Filed: Sep. 20, 1988

[30] Foreign Application Priority Data

Sep. 22, 1987 [DE] Fed. Rep. of Germany ....... 3731754

[51] Int. Cl.$^4$ ............................................. F16K 11/065
[52] U.S. Cl. ................. 137/625.48; 137/625.25
[58] Field of Search ................. 137/625.25, 625.48

[56] References Cited

U.S. PATENT DOCUMENTS

| 2,743,900 | 5/1956 | Holzer et al. | 137/625.48 X |
| 3,007,492 | 11/1961 | Grimmer | 137/625.48 X |
| 3,324,888 | 6/1967 | Henderson . | |
| 3,428,073 | 2/1969 | Krueger . | |
| 3,463,192 | 8/1969 | Herion | 137/625.25 X |
| 3,521,674 | 7/1970 | Dodson et al. | 137/625.48 |
| 3,788,354 | 1/1974 | Symmons | 137/625.48 X |
| 4,548,238 | 10/1985 | Chorkey | 137/625.25 |

FOREIGN PATENT DOCUMENTS

| 0147562 | 10/1984 | European Pat. Off. . | |
| 3636423 | 4/1988 | Fed. Rep. of Germany . | |
| 2407410 | 5/1979 | France | 137/625.66 |
| 2137735 | 10/1984 | United Kingdom . | |

Primary Examiner—Gerald A. Michalsky
Attorney, Agent, or Firm—Herbert Dubno

[57] ABSTRACT

Our invention is a three-way valve including a pressure-tight housing, a valve seat, a closing member mounted movable in the valve seat and an operating member guided through a shaft seal. The housing is formed with three connecting channels and the valve seat with associated connecting passages. The closing member has a metering passage by which two of the connecting channels are connectable alternately with a third channel with connecting passages intervening. In an additional controlling position the closing member seals the connecting channels. Our invention is characterized by a closing member formed like a sliding plate and the valve seat has two sealing disks between which the sliding plate is positioned moveable up and down. The sealing disks are equipped with the connecting passages and at least one of the sealing disks has its connecting passages in a controlling spacing which is larger than the diameter of the metering passage in the sliding plate.

6 Claims, 2 Drawing Sheets

THREE-WAY VALVE

FIELD OF THE INVENTION

Our present invention relates to a three-way valve for fluid flows.

BACKGROUND OF THE INVENTION

Conventionally, a three-way valve can comprise a pressure-tight housing, a valve seat, a closing member moveable in the valve seat and an operating member moveable in the housing through a shaft seal.

The housing is formed with three connecting channels and the valve seat has associated connecting passages. The closing member has a metering passage by which two of the connecting channels are alternately connectable with a third of the connecting channels to form a complete path through the three-way valve and the closing member seals the connecting channels from each other in an additional control position.

A ball valve with a valve seat made from an elastomeric material of this type is shown in U.K. Patent Application No. 21 37 735. The different control positions can be set by rotation of the ball valve. To determine which of the connecting channels are connected with each other an arbitrary decision must be made which correlates the position of the handle to the flow paths. Thus there is a danger of erroneous operation because the handle can be incorrectly mounted in the valve or because the user may not know the arbitrary decision which has been made.

In the known three-way valves it is also disadvantageous that the sealing surfaces on the valve ball are comparatively small and a sufficient service life is not guaranteed especially in corrosive and/or abrasive media. Leaks can lead to considerable problems when the three-way valve is used for control or metering of media which should not come into contact with one another.

OBJECTS OF THE INVENTION

It is an object of our invention to provide an improved three-way valve with good sealing properties in which the metering or regulation of different media is effected with neither undesired mixing nor leakage.

It is another object of our invention to provide an improved three-way valve with good sealing properties in which the danger of erroneous or incorrect operation is minimal.

SUMMARY OF THE INVENTION

According to our invention the closing member is formed like a sliding plate and the valve seat has two sealing disks between which the sliding plate is positioned moveable up and down.

The sealing disks are equipped with the connecting passages and at least one of the sealing disks has the connecting passages in a controlling spacing which is greater than the diameter of the metering passage in the sliding plate.

The valve is open when the sliding plate is in an upper controlling position and also again when the valve is in a lower controlling position.

In a center controlling position both paths through the valve are closed. An axial motion of the operating member is effected during operation of the sliding plate.

The controlling position is reliably determinable with the help of the controlling displacement of the operating member.

Our invention is based on the fact that in the sliding valve according to our invention the spatial arrangement of the connecting channels and the displacement of the operating member is apparent to one skilled in the art without a special decision being made.

Our invention uses the kinematics of the sliding valve with a sliding plate movable up and down in a surprising way to improve the reliability of the three-way valve. Because of the planar sealing surface between the sliding plate and the sealing disks a good seal may be attained and of course by comparison to spherically ground sealing surfaces, with reduced manufacturing expenses.

In our invention the sealing disks can have a different structure. The sealing disk adjoining the common connecting channel can have only one connecting passage which extends from the lower controlling position to the upper controlling position. The connecting passages of these sealing disks can be formed either round or slotted.

According to an advantageous feature of our invention however the sealing disks of the valve seat are identical and each have two connecting passages in a controlling spacing such that the connecting passages of one sealing disk connect to a common connecting channel and the connecting passages of the other sealing disk are associated with the other connecting channels.

One simple structure of our invention is characterized by a three-way valve in which the housing is formed with one front housing cover and a rear housing cover.

The front housing cover has a collecting space from which connecting ducts extend to the connecting passages of the adjoining sealing disk and the rear housing cover is equipped with flow ducts which combine the connecting passages of the adjoining sealing disk with the associated connecting channels.

The flow cross sections of the connecting ducts of the front housing cover and the flow ducts in the rear housing cover can be equal-sized. Hence, an additional depressurization is provided and the use of the valve is possible with large operating pressure differences. This embodiment has the advantage that the flow direction is reversible without more and the connecting channels of the front housing cover are on the inlet or outlet side according to choice.

Particularly when using an abrasive and/or corrosive media in our invention the sliding plate and the sealing disk can be made of sintered ceramic material. The sealing disks can contact on elastomeric housing seals in the housing which surround an associated connecting duct like a ring. The elastomeric housing seals do not come into contact with the flowing media and are also not exposed to shear stress by the sliding plate during operation of the sliding plate. Thus elastomeric seals having reduced wear resistance are usable. The material selection can consider corrosion resistance and/or thermal stability exclusively.

According to an advantageous feature of our invention the controlling spacing should be at least twice as large as the diameter of the metering passage in the sliding plate.

The advantages of our invention are then seen to include the following: that the danger of incorrect operation because of the careless correlation between the control path of the operating member and the spatial arrangement of the connecting channels is small.

The three-way valve according to our invention is characterized by good seal properties and in the preferred embodiment with sintered ceramic sealing disks can handle corrosive and/or abrasive media and is usable in a large temperature range. As a result the three-way valve according to our invention allows the reliable shutting-off, metering and control of different media which may not come in contact with each other alternately. That is particularly true for corrosive and abrasive media with high thermal stress.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
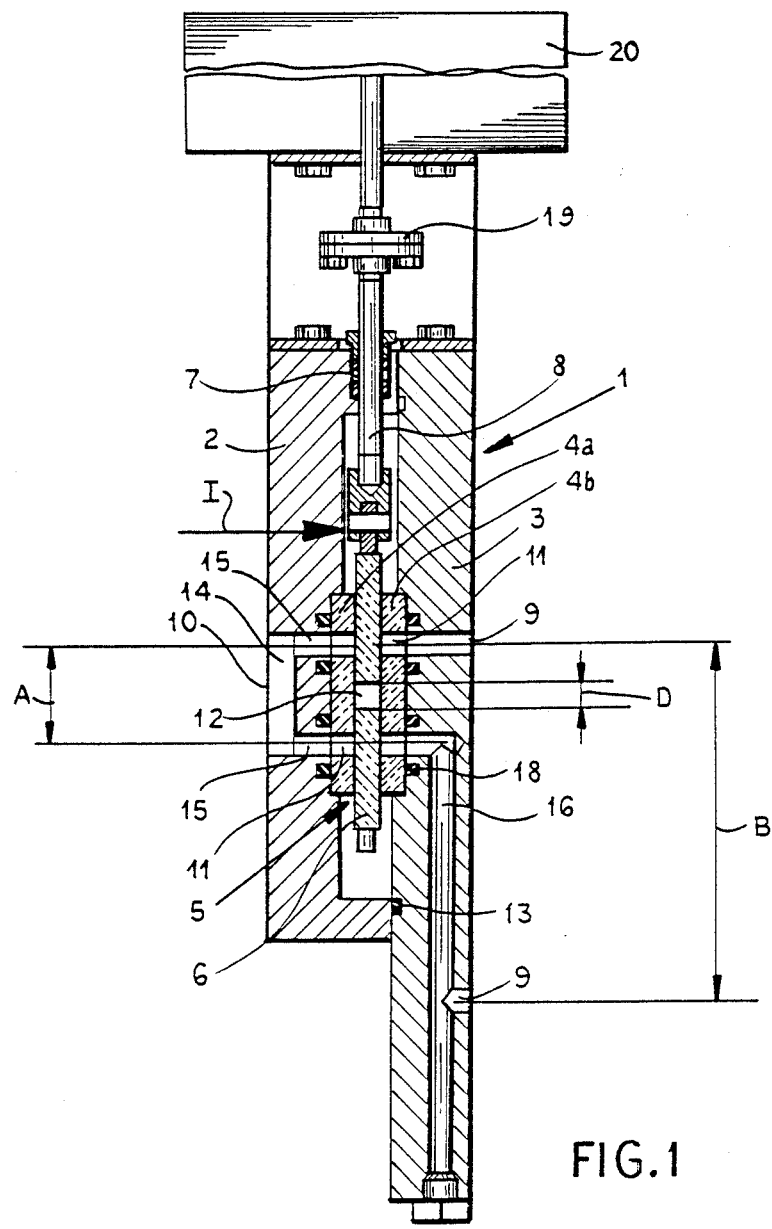
FIG. 1 is a cross sectional view through a three-way valve according to our invention.

The three-way valve in the drawing is part of a pressure-tight housing 1 with a front housing cover 2 and a rear housing cover 3, a valve seat 5 comprising two sealing disks 4a, 4b, a closing member 6 mounted moveably in it which in this example is a sliding plate and an operating member 8 guided in the housing 1 through a shaft seal 7 of the housing 1 for the closing member 6.

Especially as can be seen from FIG. 1 the housing 1 is formed with three connecting channels 9, 10, the valve seat 5 has associated connecting passages 11 and the closing member 6 has a metering passage 12. Two connecting channels 9 are connectable alternately with the third connecting channel 10 to form a complete path through the valve.

The connecting passages 11 of the sealing disk 4a are arranged in a controlling space A which is larger than the diameter D of the metering passage 12 of the closing member 6 (i.e. the sliding plate). Hence, the closing member 6 can take an additional control position which is shown in FIG. 1 in which the connecting channels 9, 10 are sealed from each other.

In this construction the housing 1 is formed in two parts. The front housing cover 2 and the rear housing cover 3 are screwed together with an intervening cover seal 13. The sealing disks 4a, 4b are identical.

The front housing cover 2 has a collecting space 14 which bounds the connecting channel 10 from which the connecting ducts 15 extend to the connecting passages 11 of the sealing disk 4a.

The rear housing cover 3 is equipped with flow ducts 16 which connect the connecting passages 11 of the sealing disk 4b with the associated connecting channels 9.

Figure 2:
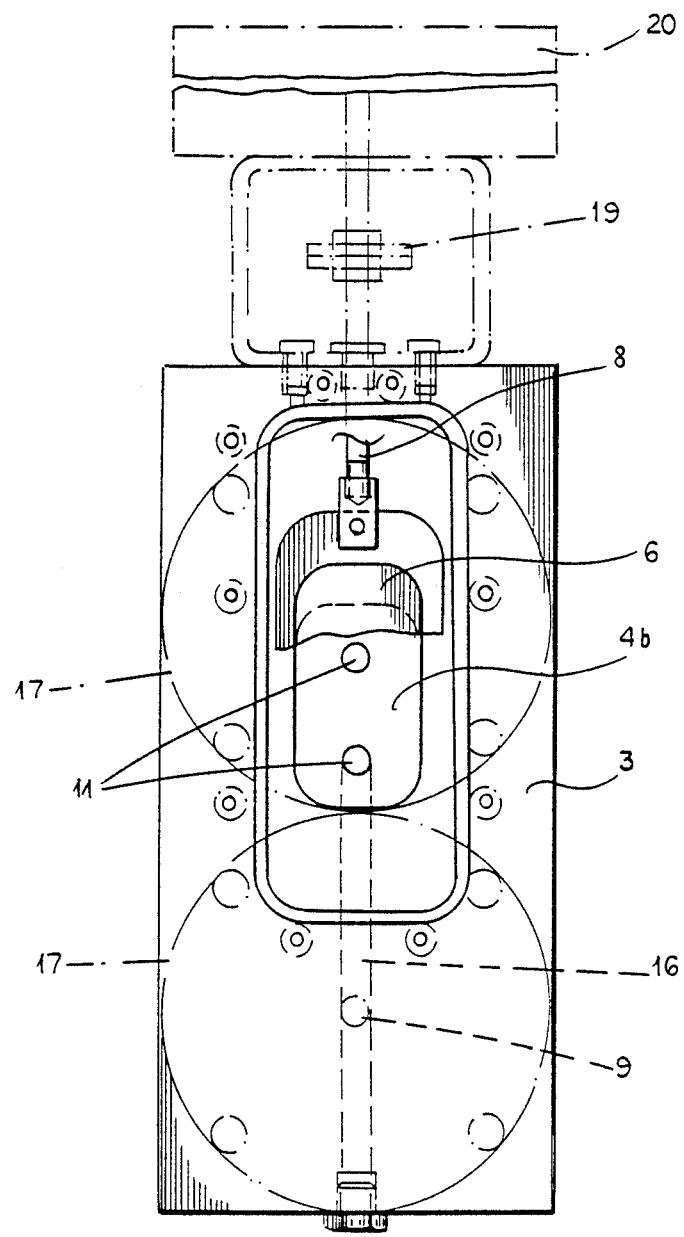
FIG. 2 is an elevational view of the three-way valve shown in FIG. 1 taken in the direction of arrow I in FIG. 1.

The flow cross section of the duct 15 of the front housing cover 2 and the flow duct 16 in the rear housing cover are equal-sized. FIG. 1 shows that the flow ducts 16 in the rear housing cover 3 are arranged so that the connecting channels 9 have a spacing B required for connecting to tubes or pipes. As indicated in FIG. 2 the housing covers 2, 3 are formed with sealing surfaces and normal pipe flanges 17 can be connected.

The closing member 6 (i.e. the sliding plate 6) and the sealing disks 4a, 4b are made of a sintered ceramic material in this example. The sealing disks 4a, 4b are supported on elastomeric housing seals 18 and contact with a suitable sealing force on the sliding plate (which is closing member 6).

The elastomeric housing seals 18 surround like rings an associated connecting passage 11. Advantageously O-ring seals are used with a round or square cross section.

The controlling spacing A between the connecting passages 11 is at least twice the size of the diameter D of the metering passage 12 in the sliding plate. The operating member 8 for the closing member 6 is connected by a coupling 19 to a lifting mechanism 20.

We claim:

1. In a three-way valve comprising a pressure-tight housing, a valve seat, a closing member moveable in said valve seat and an operating member moveable in said housing through a shaft seal, in which said housing has three connecting channels, said valve seat has associated connecting passages and said closing member has a metering passage by which two of said connecting channels are alternately connectable with a third of said connecting channels to form a complete path through said three-way valve and in which said closing member seals said connecting channels from each other in an additional control position, the improvement wherein said closing member is formed as a sliding plate, said plate having a single metering passage, said valve seat has two sealing disks between which said sliding plate is positioned moveable up and down, said sealing disks being equipped with said connecting passages and at least one of said sealing disks having said connecting passages in a controlling spacing which is greater than the diameter of said metering passage in said sliding plate, said housing consists essentially of a front and a rear housing cover, and said controlling space is at least twice as large as said diameter of said metering passage in said sliding plate.

2. The improvement defined in claim 1 wherein said sealing disks of said valves seat are identical and two of said connecting passages have said controlling spacing, said connecting passages of one of said sealing disks being connected to a common one of said connecting channels and said connecting passages of the other of said sealing disks being connected to the other of said connecting channels.

3. The improvement defined in claim 2 wherein said housing has a front housing cover and a rear housing cover, said front housing cover having a collecting space from which connecting ducts extend to said connecting passages of said sealing disks and said rear housing cover having a plurality of flow ducts which connect said connecting passages of said sealing disk with said connecting channels, the flow cross section of said connecting duct of said front housing cover and said flow ducts in said rear housing cover being equal-sized.

4. The improvement defined in claim 1 wherein said closing member and said sealing disks are made of sintered ceramic material and said sealing disks contact on an elastomeric housing seal which surrounds like a ring an associated one of said connecting passages.

5. The improvement defined in claim 1 further comprising an operating member for said closing member movably penetrating said housing through a shaft seal in said housing.

6. A three-way valve, especially for metering abrasive and/or corrosive fluids without significant leakage, comprising:
- a pressure-tight housing with three connecting channels consisting essentially of a front housing cover and a rear housing cover, said front housing cover having a collecting space;
- a valve seat comprising two identical sintered ceramic sealing disks equipped with a plurality of connecting passages;
- a closing member formed as a sintered ceramic sliding plate moveable in said valve seat between said sealing disks having a single metering passage by which two of said connecting channels are alternately connectable with a third of said connecting channels to form a complete path through said three-way valve, said closing member sealing said connecting channels from each other in an additional controlling position, at least one of said sealing disks having said connecting passages in a controlling spacing which is at least twice as great as the diameter of said metering passage in said sliding plate, said connecting passages of one of said sealing disks being connected to a common connecting channel and said connecting passages of the other of said sealing disks being connected to the other of said connecting channels, said collecting space having connecting ducts extending to said connecting passages of said sealing disk and said rear housing cover having a plurality of flow ducts which connect said connecting passages of said sealing disk with said connecting channels, the flow cross section of said connecting ducts of said front housing cover and said connecting channels in said said rear housing cover being equal-sized;
- an elastomeric housing seal in said housing contacting on each of said sealing disks surrounding like a ring each of said connecting passages; and
- an operating member for said closing member movably penetrating said housing through a shaft seal.

* * * * *